Figure 3A:
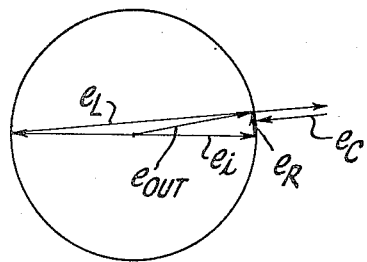

May 8, 1951
A. KREITHEN
2,551,802
PHASE MODULATOR
Filed Jan. 5, 1948
3 Sheets-Sheet 1
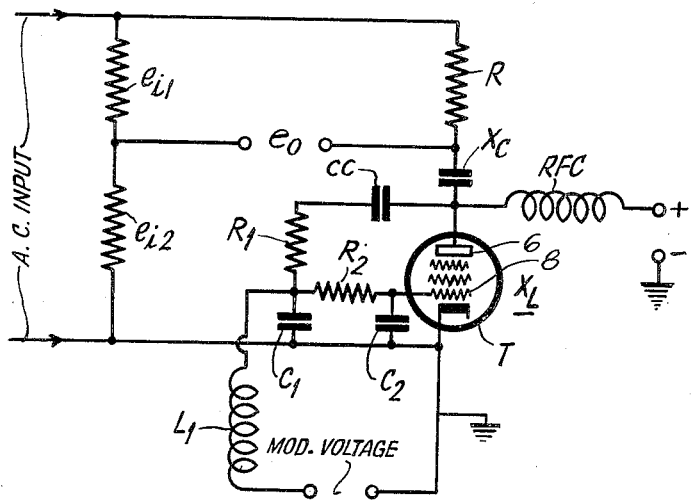
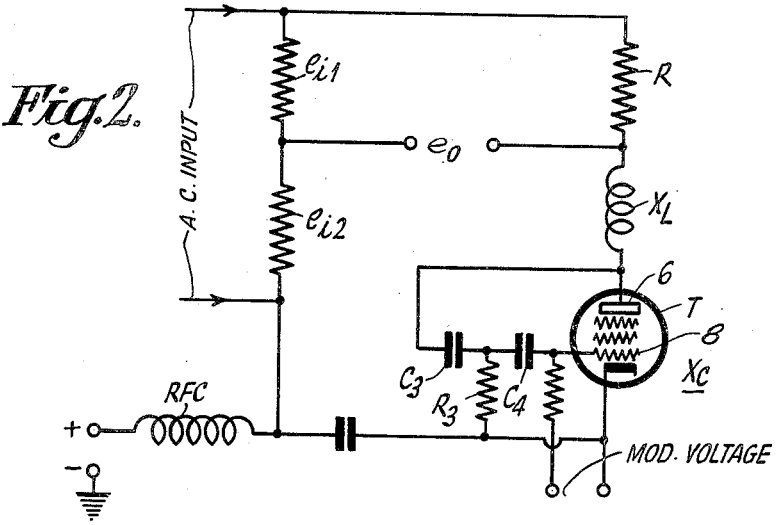
INVENTOR
Alexander Kreithen.
BY Harry Tomick
ATTORNEY May 8, 1951 A. KREITHEN 2,551,802
PHASE MODULATOR
Filed Jan. 5, 1948 3 Sheets-Sheet 3
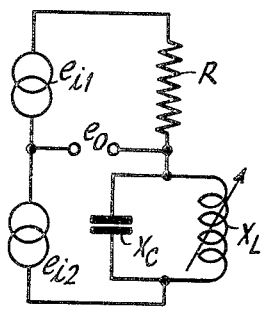
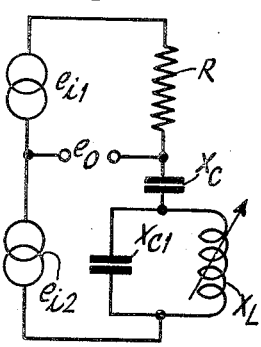
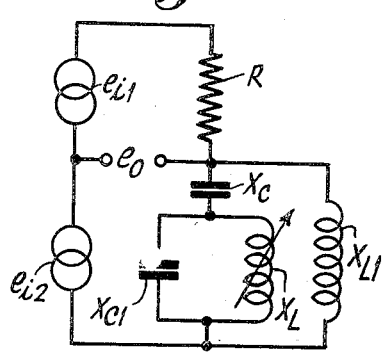
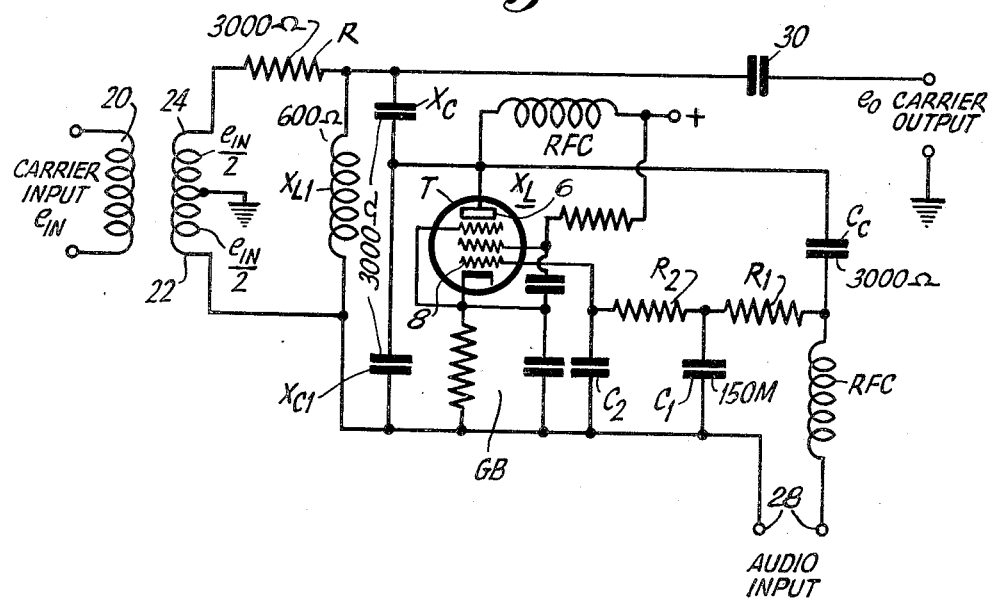
INVENTOR
Alexander Kreithen
BY Larry Tomick
ATTORNEY Patented May 8, 1951

2,551,802

UNITED STATES PATENT OFFICE 2,551,802

PHASE MODULATOR

Alexander Kreithen, Philadelphia, Pa., assignor to Radio Corporation of America, a corporation of Delaware Application January 5, 1948, Serial No. 639

10 Claims. (Cl. 332—23)

This application discloses a phase modulator wherein means is provided for relatively varying the phase of alternating current such as, for example, a carrier wave through a range of almost ±180° in accordance with a modulating voltage. The variation in phase is accomplished without amplitude variation.

The advantages of such a modulator are numerous, one important advantage being that if the modulation is corrected so that the phase libration is equivalent to frequency modulation the large initial phase deviation reduces the number of frequency multiplying stages necessary to provide the required total swing to meet, for example, the FCC frequency modulation broadcast requirements.

In describing my invention in detail, reference will be made to the attached drawings wherein, Fig. 1 is a circuit diagram of my phase shifter with a reactance tube connected in the circuit as the variable reactance and with modulation applied to the reactance tube. The phase shifter takes the form of a bridge circuit with four arms one of which includes the variable reactance.

Fig. 2 is a modification of the arrangement of Fig. 1.

Figs. 3a to 3e inclusive are vector diagrams used to illustrate the manner in which the phase deviation is obtained, Fig. 4 is a modification of the arrangements of Figs. 1 and 2.

Figs. 5 and 6 are modified circuits wherein the variable reactance variation results in larger variations in the phase of the voltage at the output of the phase shifter, and Fig. 7 is a more complete showing of the basic circuit of Fig. 6 with the reactance tube modulator connected therein.

In Fig. 1, $e_i$ represents a pair of voltage sources, one being in one arm of a bridge, and the other being in an adjacent arm of a bridge circuit. R represents a resistance in a third arm of the bridge. $X_C$ represents a capacitive reactance and $X_L$ represents a variable reactance which is inductive in character. $e_{i1}$ and $e_{i2}$ may be considered as input sources and taken together represent an input voltage. The phase shifted voltage may be taken off from the output terminals $e_0$ for use and the voltage phase is shifted in accordance with variations in the reactance of $X_L$.

Figure 3B:
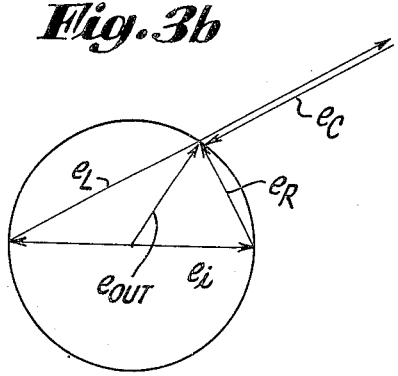
Figure 3C:
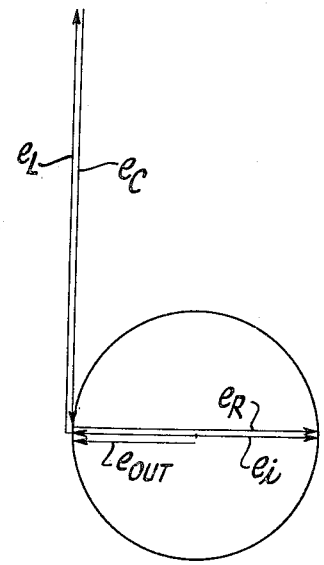
Figure 3D:
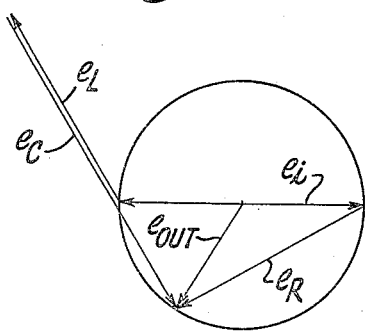
Figure 3E:
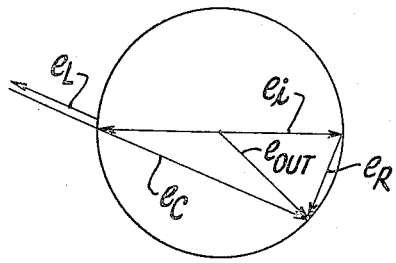

As the inductance $X_L$ is varied, the phase of the voltage at the output terminals shifts. This output voltage is represented at $e_{out}$ in the vector diagrams 3a to 3e inclusive. In these diagrams, $e_L$ represents the voltage drop across the inductance $X_L$. $e_C$ represents the voltage drop across the capacitance $X_C$. $e_R$ represents the voltage drop across the resistor R and $2e_i$ represents the total push-pull input voltage, the center tap on this voltage being at the center of the circle. In these vector diagrams:

Fig. 3a shows the voltage vectors where
$$X_L \gg X_C \gg R$$
Fig. 3b shows the voltage vectors where
$$X_L > X_C \gg R$$
Fig. 3c shows the voltage vectors where
$$X_L = X_C \gg R$$
Fig. 3d shows the voltage vectors where
$$X_L < X_C \gg R$$
Fig. 3e shows the voltage vectors where
$$X_L \ll X_C \gg R$$

In Figs. 3a–3e, certain of the voltage vectors which are in phase have been drawn as parallel lines in order to avoid confusion.

The variable inductance $X_L$ of Fig. 1 is in accordance with my invention, a reactance tube in a phase shifter or modulator circuit. This reactance tube T has its anode 6 coupled to its control grid by a coupling condenser CC, a phase delaying resistor $R_1$ and a phase shifting condenser $C_1$. A second phase shifting resistor $R_2$ and phase shifting condenser $C_2$ is used in order that at least 90° phase displacement between the voltage on the anode 6 and the control grid 8 is obtained. Since the phase of the voltage on the grid of the reactance tube is relatively retarded, the tube T reactance is inductive in character and is represented by $X_L$. A simple multiple stage phase shifter is shown and the phase of the voltage in the network is retarded in two steps to get the required phase shift with large amplitude signal on the grid. The modulating potentials are applied between the cathode of tube $X_L$ and its control grid through a radio frequency choking inductance $L_1$. Other electrodes may be modulated instead of the control grid. The anode 6 of the tube T is connected to a source of direct current potential by a radio frequency choke RFC. The negative terminal of this source is grounded and thereby connected to the cathode of tube $X_L$. When the cathode is grounded, the output circuit at the output terminals $e_0$ is not to be grounded.

In operation, the control potential or modulation is applied to the leads marked "modulating voltage." The output is taken from the leads marked "$e_o$." The applied voltage varies the grid bias thereby varying the transconductance of the tube. The tube reactance $X_L$ is a function of the transconductance of the tube and as a consequence, varying the grid voltage varies the reactance in this arm of the bridge to correspondingly vary the phase of the output voltage $e_{out}$. At zero modulation the reactances of $X_L$ and $X_C$ are about equal and the phase angle of the output voltage is then in carrier or no modulation condition. The phase networks $R_1$, $C_1$, $R_2$, $C_2$ are adjusted to compensate for the plate resistance of the reactance tube so that there is no resistive component in the simulated reactance and no amplitude variation of the output voltage $e_{out}$.

In the embodiment of Fig. 1, the reactance tube is inductive in character and the other reactive element is capacitive. Where the reactance tube is made capacitive, the other reactive element is made of opposite sign. Then a phase shifter bridge as illustrated in Fig. 2 may be used. In this phase shifter, the quadrature voltage network between the anode and grid of tube T is again cascaded and comprises capacitors $C_3$ and $C_4$ which cooperate with the resistor $R_3$ and the resistance between the control grid and modulating source of the tube T to relatively advance the phase of the voltage on the control grid approximately 90° with respect to the phase of the voltage on the anode 6. Then the tube T output impedance simulates a capacity $X_C$ in the arm of the bridge and this capacity is varied as described above in accordance with the modulating potentials. Here and in the other embodiments, when the reactance of the tube circuit is varied by varying its transconductance, as described above, the output voltage $e_{out}$ varies in phase but not in amplitude with respect to the input voltage $e_1$. The values of $X_L$ and $X_C$ here are again about equal at no modulation and phase shift of the output voltage $e_{out}$ takes phase as shown vectorially in Figs. 3a to 3e.

It will be seen that in both embodiments described above and in the modifications described hereinafter, the phase of $e_{out}$ with respect to $e_1$ can be varied as much as $\pm 180°$ by letting $X_L(X_C)$ become larger or smaller than $X_C(X_L)$. The circuit is of great importance in phase modulators for use in generating FM and produces a larger phase deviation with one variable element than have previous phase modulators, which have been restricted to $\pm 90°$.

In the embodiments described hereinbefore, the reactance tube variations must be relatively large to change the phase of the voltage the desired amount. For example, in Fig. 1, for $X_C=10R$ for a change in phase of from 40° to 320°, a change in reactance of from $X_L=1.275X_C$ to $X_L=.725X_C$ is required. This is a reactance change of 55%, which is difficult to accomplish linearly with an ordinary reactance tube. The embodiment of Fig. 2 is similar in this respect. Accordingly, I have devised the circuit of Fig. 5 in which $X_C=10R$ and $X_{C1}=20R$, and in which a reactance change of 37% for the same phase shift is required. In this embodiment, the variable inductance $X_L$ is shunted by a capacitor $X_{C1}$ and the parallel combination is then in series with $X_C$. Here $X_L$ and $X_C$ are not equal but are approximately equal at zero modulation. It can be shown mathematically that in the bridge circuit of Fig. 5, smaller variations of $X_L$ result in larger phase changes in the voltage $e_{out}$. This increase in amount of phase change as a result of variations of $X_L$ is due to the fact that the embodiment of Fig. 5 has two resonance relations instead of one as is the case in the arrangements of Figs. 1 and 2. $X_C$ and $X_L$ have a distinct resonance characteristic. $X_{C1}$ and $X_L$ have another resonance relation and perhaps $X_{C1}-X_C$ and $X_L$ have a third resonance characteristic. The inductive reactance here represents the reactance tube when the system is used for modulation purposes and a phase retarding quadrature network such as illustrated in Fig. 1 is connected between the anode and grid of the reactance tube T.

In the embodiment of Fig. 6, the parallel combination of $X_{C1}$ and $X_L$ in series with $X_C$ is shunted by an additional inductance $X_{L1}$. In this embodiment, a reactance change of only 20% is needed to provide the phase shift mentioned above from 40° to 320° in the output voltage $e_{out}$. Here again, $X_L$ and $X_C$ are not equal but may be said to be approximately equal. In this embodiment, there are a series of resonance relations including separate resonance relations between $X_C$ and $X_L$; $X_{C1}$ and $X_L$; $X_{C1}$, $X_C$ and $X_L$; $X_C$, $X_L$ and $X_{L1}$ so that as stated above, a reactance change ($X_L$ or $X_C$ with appropriate change) of only 20% results in a 40° to 320° phase change in the output voltage $e_{out}$.

Similarly to Fig. 5, the inductive reactance $X_L$ of Fig. 6 represents the reactance tube when the circuit is used for modulation purposes and a phase retarding quadrature network such as illustrated in Fig. 1 is connected between the anode and grid of such reactance tube.

The embodiments of Figs. 5 and 6 may be modified in the same manner in which the embodiment of Fig. 1 has been modified as illustrated in Fig. 2. Then the reactance $X_C$ of Figs. 5 and 6 is replaced by $X_L$ and the reactance $X_L$ is replaced by $X_C$ which is the variable and is then shunted by $X_L$ in Figs. 5 and 6 and also by an $X_{C1}$ in Fig. 6. The operation then is as described above as will be apparent to those versed in this art.

Another problem is that of keeping the resistive component of the reactance tube low. The need for large changes in reactance makes it difficult to maintain low resistance or high Q in the reactance tube as the input is varied. The circuit in Fig. 4 which uses the parallel reactances makes it easier to get practical values of high Q out of a reactance tube. In Fig. 1, where the reactance tube is in series arrangement, a value for the resistance R might be 300 ohms; for $X_C$, 3,000 ohms and then the reactance tube would have to supply 3,000 ohms of inductive reactance at a Q of say 50 in order to keep the amplitude variation down. This would mean the resistance component would have to be 60 ohms. In addition to swinging completely around to say 340° the $X_L$ would have to get to be about 300 ohms with good Q. Since the reactance is given approximately by $$\frac{E_p}{E_g} \times \frac{1}{g_m}$$

it is apparent that even with a tube of $g_m=5,000$ $\mu$mhos it is difficult to get much below 1,000 ohms of reactance or resistance. In the parallel arrangement of Fig. 4, for $R=300$; $X_C=3,000$, $X_L=3,000$ at zero modulation the parallel resistive component for a Q of 50 will be 150,000 ohms which is much easier to attain in practice.

A complete modulator using the improved bridge circuit of Fig. 6 is illustrated in Fig. 7. In this diagram, typical values for the elements of Fig. 6 are given, but other values may be used and will be used if a voltage of different frequency is applied at $e_i$. In Fig. 7, 20 is a carrier current input transformer the primary winding of which is excited by alternating current of volttage $e_i$. The secondary winding of this transformer includes two inductive portions 22 and 24 which form two arms of the bridge, and a voltage $e_{i/2}$ is set up across each of these arms. A third arm includes resistor R while the fourth arm comprises the tube T of reactance $X_L$ indicated schematically as an inductance coil in Fig. 6 in series with the capacitor $X_C$. The tube reactance $X_L$ is shunted by capacitor $X_{C1}$ and $X_L$ and $X_C$ in series are shunted by inductor $X_{L1}$. The output is taken through coupling condenser 30 across the bridge diagonal. A phase retarding network couples the anode 6 of tube T to its control grid substantially as in Fig. 1. Modulation is fed from input contacts 28 through the phase shifting network to the control grid. Anode and screen grid potentials are supplied from a source not shown having its positive terminal connected by a resistor to the screen grid and by an RF choke to the tube-anode 6. Bias for the control grid is generated by tube current in resistor capacitor unit GB. The carrier voltage supplied at 20 is $10^5$ cycles/second and the various elements of the circuit had the values listed adjacent thereto on the drawings. The carrier frequency may be of any desired value and then the circuit element values are appropriately changed.

What is claimed is:

1. In a phase shifter, a bridge circuit having four arms and a diagonal, a source of alternating voltage connected directly in series in one arm of said bridge to constitute such one arm, another source of alternating voltage connected directly in series in a second arm of said bridge to constitute such second arm, said second arm being adjacent to said one arm, an impedance in the third arm of said bridge, a reactance in the fourth arm of said bridge, said reactance including a variable reactance element shunted by a fixed reactance element of opposite sign, and means for varying said variable element to vary the phase of the alternating current appearing in the diagonal of said bridge.

2. In apparatus for shifting the phase of alternating current substantially 360°, a bridge circuit having four arms each including an impedance, connections for impressing alternating current the phase of which is to be shifted on two adjacent arms of said bridge, an output circuit connected between the adjacent terminals of said last mentioned two arms and the adjacent terminals of the remaining two arms, said remaining arms comprising in one thereof a resistor and in the other thereof reactances, of unlike signs, in series, one of said last named reactances comprising the anode to cathode impedance of an electron discharge device with an alternating current phase shifting network coupling its anode to its control grid, and means for controlling the conductivity of said device in accordance with control potentials to thereby alter the value of said tube reactance and the phase of the output voltage.

3. Apparatus as recited in claim 2 wherein said phase shifting network relatively retards the phase of the alternating current reaching the control grid of said device and said one reactance is inductive.

4. Apparatus as recited in claim 2 wherein said network relatively advances the phase of the alternating current reaching said control grid of said device and said one reactance is capacitive.

5. In a phase shifter, a bridge circuit having four arms and a diagonal, means for setting up alternating voltages in adjacent arms of said bridge, an impedance in the third arm of said bridge, a variable reactance in the fourth arm of said bridge, said variable reactance including an electron discharge device having a control grid and having its anode to cathode impedance in said fourth arm, the arrangement being such that alternating voltage of a first phase appears on the anode of the device, means for impressing alternating voltage displaced in phase about 90° from said first phase on the control grid of said device, and connections for applying modulating potentials to an electrode of said device to vary the transconductance of the device and correspondingly vary its reactance and the phase of the alternating current appearing in the diagonal of said bridge.

6. A phase shifter as recited in claim 5 wherein said impedance in the third arm is a resistor and wherein said variable reactance is inductive in character.

7. A shifter as recited in claim 5 wherein said variable reactance is inductive and is shunted by a reactance which is capacitive.

8. In a phase shifter, a bridge circuit having four arms and a diagonal, means for setting up alternating voltages in adjacent arms of said bridge, an impedance in the third arm of said bridge, a reactance in the fourth arm of said bridge, said reactance including a variable reactance element shunted by a fixed reactance element of opposite sign, a third reactance connected in series in said fourth arm, and means to vary said variable element to vary the phase of the alternating current appearing in the diagonal of said bridge.

9. A phase shifter as recited in claim 8 wherein a fourth reactance is connected in parallel with said series arrangement in said fourth arm.

10. In a phase shifter, a bridge circuit having four arms and a diagonal, means for setting up alternating voltages in adjacent arms of said bridge, an impedance in the third arm of said bridge, a variable reactance in the fourth arm of said bridge, means connecting said variable reactance in series with a capacitive reactance and in shunt with a capacitive reactance, means connecting the series arrangement in shunt with an inductive reactance, said variable reactance including an electron discharge device having a control grid and having its anode-to-cathode impedance in said fourth arm, the arrangement being such that alternating voltage of a first phase appears on the anode of the device, means for impressing alternating voltage displaced in phase about 90° from said first phase on the control grid of said device, and connections for applying modulating potentials to an electrode of said device to vary the transconductance of the device and correspondingly vary its reactance and the phase of the alternating current appearing in the diagonal of said bridge.

ALEXANDER KREITHEN.

(References on following page)

REFERENCES CITED

The following references are of record in the file of this patent:

UNITED STATES PATENTS

| Number | Name | Date |
|---|---|---|
| 1,284,293 | Fortescue | Nov. 12, 1918 |
| 1,900,538 | Bedford | Mar. 7, 1933 |
| 1,950,406 | Hoorn | Mar. 13, 1934 |
| 2,045,107 | Shore | June 23, 1936 |
| 2,169,859 | Usselman | Aug. 15, 1939 |
| 2,189,896 | Gutzman | Feb. 13, 1940 |
| 2,228,869 | Chireix | Jan. 14, 1941 |
| 2,231,995 | Schrader | Feb. 18, 1941 |
| 2,374,000 | Crosby | Apr. 17, 1945 |
| 2,414,475 | Marchand | Jan. 21, 1947 |
| 2,447,040 | Stodola | Aug. 17, 1948 |